(12) United States Patent
Lee et al.

(10) Patent No.: US 7,782,399 B2
(45) Date of Patent: Aug. 24, 2010

(54) SYSTEM AND A METHOD TO AVOID ON-SCREEN FLUCTUATIONS DUE TO INPUT SIGNAL CHANGES WHILE IN AN OSD OR GRAPHIC CENTRIC MODE

(75) Inventors: Janghwan Lee, Westfield, IN (US); Carlton Jethro Simmons, Jr., Fortville, IN (US); Charles William Worrell, Carmel, IN (US)

(73) Assignee: Thomson Licensing, Boulogne (FR)

( * ) Notice: Subject to any disclaimer, the term of this patent is extended or adjusted under 35 U.S.C. 154(b) by 652 days.

(21) Appl. No.: 10/563,892

(22) PCT Filed: Jan. 13, 2004

(86) PCT No.: PCT/US2004/000713

§ 371 (c)(1),
(2), (4) Date: Jan. 9, 2006

(87) PCT Pub. No.: WO2005/018229

PCT Pub. Date: Feb. 24, 2005

(65) Prior Publication Data

US 2006/0197871 A1    Sep. 7, 2006

Related U.S. Application Data

(60) Provisional application No. 60/488,878, filed on Jul. 21, 2003.

(51) Int. Cl.
H04N 5/46 (2006.01)
H04N 5/50 (2006.01)
H04N 11/00 (2006.01)
H04N 7/00 (2006.01)
H04N 9/64 (2006.01)

(52) U.S. Cl. ............. 348/557; 348/558; 348/465; 348/467; 348/569; 348/563; 348/575; 348/581; 348/584; 348/441

(58) Field of Classification Search ............ 348/557, 348/558, 465, 467, 569, 563, 564, 565, 575, 348/581, 582, 584, 441
See application file for complete search history.

(56) References Cited

U.S. PATENT DOCUMENTS 5,784,123 A * 7/1998 Yoshimi ............ 348/556

(Continued)

FOREIGN PATENT DOCUMENTS

JP    10 304272 A    11/1998

(Continued)

OTHER PUBLICATIONS

Search Report dated Sep. 3, 2004.
EP Search Report dated Jan. 24, 2008.

*Primary Examiner*—Brian P Yenke
(74) *Attorney, Agent, or Firm*—Robert D. Shedd

(57) ABSTRACT

The disclosed embodiments relate to a system and method for modifying video signals. The system may comprise at least one decoder that decodes a video signal that comprises embedded picture setting data, and a video processor that is adapted to detect whether the system is operating in an on-screen display ("OSD") mode, apply the embedded picture setting data if the system is not in the OSD mode, and withhold the embedded picture setting data if the system is in the OSD mode. The method may comprise the acts of decoding a video signal that comprises embedded picture setting data, detecting whether a system is operating in the OSD mode, applying the embedded picture setting data if the system is not in the OSD mode, and withholding the embedded picture setting data if the system is in the OSD mode.

20 Claims, 3 Drawing Sheets

U.S. PATENT DOCUMENTS

| | | | |
|---|---|---|---|
| 5,956,092 A * | 9/1999 | Ebihara et al. | 348/445 |
| 5,969,767 A * | 10/1999 | Ishikawa et al. | 348/564 |
| 6,151,078 A * | 11/2000 | Yoneda et al. | 348/558 |
| 6,204,887 B1 * | 3/2001 | Hiroi | 348/565 |
| 6,256,027 B1 * | 7/2001 | Jeong et al. | 715/788 |
| 6,421,094 B1 | 7/2002 | Han | |
| 6,462,786 B1 | 10/2002 | Glen et al. | |
| 6,556,253 B1 * | 4/2003 | Megied et al. | 348/565 |
| 6,646,685 B1 * | 11/2003 | Kim | 348/569 |
| 6,690,425 B1 * | 2/2004 | Worrell | 348/445 |
| 6,714,253 B2 * | 3/2004 | Kim et al. | 348/556 |
| 7,023,496 B2 * | 4/2006 | Nagata et al. | 348/673 |
| 7,046,302 B2 * | 5/2006 | Konuma | 348/558 |
| 7,206,029 B2 * | 4/2007 | Cohen-Solal | 348/565 |
| 7,307,669 B2 * | 12/2007 | Bhatia et al. | 348/581 |
| 7,362,383 B2 * | 4/2008 | Reneau et al. | 348/706 |
| 2002/0040474 A1 | 4/2002 | Ohkita | |
| 2002/0051154 A1 | 5/2002 | Aneja et al. | |
| 2003/0097656 A1 | 5/2003 | Tsubouchi | |
| 2003/0115613 A1 | 6/2003 | Jang et al. | |
| 2003/0231259 A1 | 12/2003 | Yui et al. | |

FOREIGN PATENT DOCUMENTS

| | | |
|---|---|---|
| KR | 2002-0025639 A | 4/2000 |
| KR | 2002-0014830 A | 2/2002 |
| WO | WO 01/06797 A | 1/2001 |

* cited by examiner

SYSTEM AND A METHOD TO AVOID ON-SCREEN FLUCTUATIONS DUE TO INPUT SIGNAL CHANGES WHILE IN AN OSD OR GRAPHIC CENTRIC MODE

This application claims the benefit, under 35 U.S.C. §365 of International Application PCT/US04/00713, filed Jan. 13, 2004, which was published in accordance with PCT Article 21(2) on Feb. 24, 2005 in English and which claims the benefit of U.S. provisional patent application No. 60/488,878, filed Jul. 21, 2003.

FIELD OF THE INVENTION

The present invention relates generally to displaying video programming on a television or monitor. More specifically, the present invention relates to a method for reducing on-screen fluctuations from channel changes when video signals are displayed using an On-Screen Display or Graphic Centric Mode.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Modern video systems increasingly use sophisticated video display technologies such as an on-screen display or a graphic centric mode (referred to collectively as an "OSD") to assist in the display of video. The OSD facilitates features such as an on-screen guides and web browsers. In this set-up, the video is shown in a window that occupies less than the entire video screen.

During normal, non-OSD operation, the picture settings for a display device may change rapidly for a variety of reasons. These reasons include, but are not limited to, channel changes and commercial breaks. In response to these rapid changes in the pictures settings, a decoder unit, such as a cable box, or the display device, such as a television or digital light projection system ("DLP"), can automatically adjust the screen format or colorimetry of the display. These adjustments may be based on picture data that is embedded within the incoming video signal or based on default picture data determined by the type of video signal. The new picture settings are generally applied fairly abruptly, but most viewers do not notice the abrupt changes because the entire screen changes when the input changes. On the contrary, when the video is displayed using an OSD, the OSD does not change when the input changes. In this situation, when the display adjusts the picture settings in response to a change in the picture data, it can cause noticeable, abrupt on-screen fluctuations that can annoy viewers.

SUMMARY OF THE INVENTION

The disclosed embodiments relate to a system and method for modifying video signals. The system may comprise at least one decoder that decodes a video signal that comprises embedded picture setting data, and a video processor that is adapted to detect whether the system is operating in an on-screen display ("OSD") mode, apply the embedded picture setting data if the system is not in the OSD mode, and withhold the embedded picture setting data if the system is in the OSD mode. The method may comprise the acts of decoding a video signal that comprises embedded picture setting data, detecting whether a system is operating in the OSD mode, applying the embedded picture setting data if the system is not in the OSD mode, and withholding the embedded picture setting data if the system is in the OSD mode.

The characteristics and advantages of the present invention may become more apparent from the following description, given by way of example.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
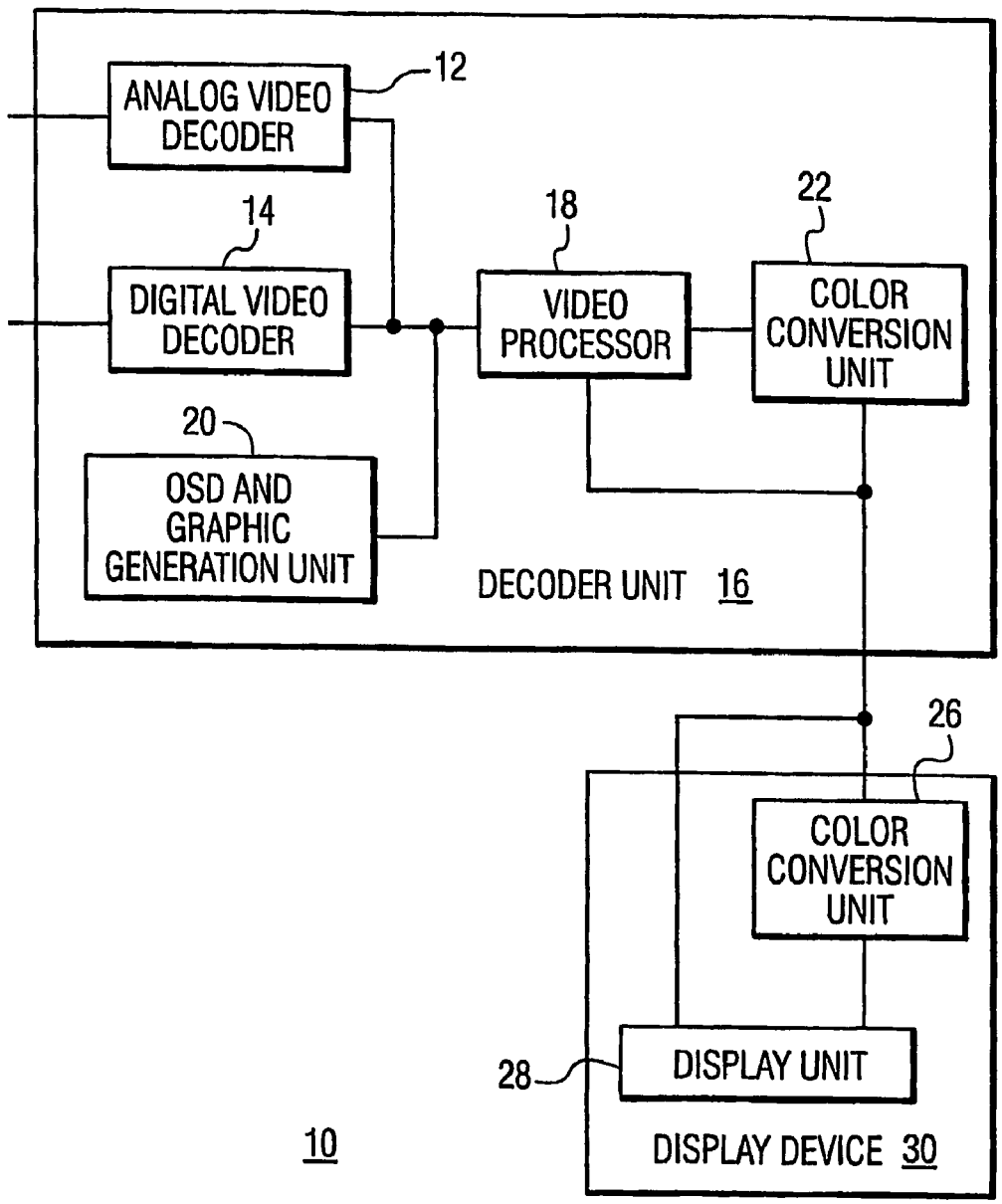
FIG. 1 is a block diagram of a video system with analog and digital video decoder inputs in accordance with embodiments of the present invention.

FIG. 1 is a block diagram of a video system with analog and digital video decoder inputs in which embodiments of the present invention may be employed. The diagram is generally referred to by the reference numeral 10. The video system 10 comprises a decoder unit 16 and a display device 30. An analog signal decoder 12 and a digital signal decoder 14 may be among the features of the decoder unit 16. These two types of signal decoders are configured to receive either incoming video signals from a video provider, such as a cable or satellite television provider.

Once the incoming video signal is received, the decoder unit 16 determines whether picture data, such as colorimetry data or screen format data, has been encoded in the incoming video signal by the broadcaster. This determination can be done, for example, by a Video processor 18. If the incoming video signal does contain embedded picture data, it is extracted. If the video system 10 is not currently in an On Screen Display or other Graphic Centric Mode (referred to collectively as the "OSD"), the embedded picture data alone is used to select the screen format and an associated color conversion matrix. If the video system 10 is currently in an OSD, the screen format remains unchanged and the color conversion matrix is selected to convert the incoming video signal to match current colorimetry settings for the OSD. The current colorimetry settings for the OSD are the colorimetry settings being used by the video system 10 to currently display a video signal. These settings may be based on a variety of factors including the type of display device or the type of video signal currently being displayed.

If the incoming video signal does not contain embedded picture data, default picture data may be substituted. The default picture data is determined based on the type of incoming video signal. For example, if the incoming video signal is an analog NTSC video signal, colorimetry standard 170M may be used; or if the video signal is an analog high definition video signal, standard high definition color imagery 274 colorimetry may be used. Default picture data can be programmed for any type of input video signal and can vary based on factors known to those skilled in the art.

The analog and digital decoders transmit the incoming video signal to the video processor 18. If the video system 10 is operating in OSD mode, the video processor may combine video signal with the OSD. The OSD can also be combined with the incoming video signal at other places within the video system 10. Next, the video signal may undergo a color conversion process at a color conversion unit 22. It should be noted that the color conversion process may also take place within the video processor 18, within the display device 30 (as shown in block 26), or within any combination of these three places. The color conversion process applies the color conversion matrix that was generated by the decoder unit 16. Once the color conversion matrix has been applied, the incoming video signal's colorimetry settings closely match the current picture settings for the OSD.

The incoming video signal may then be transmitted to the display device 30. As stated above, the video signal may undergo partial or complete color conversion in the color conversion unit 26 located in the display device 30. Similarly, the screen format may be adjusted either in whole or in part by the decoder unit 16, the display device 30, or a combination of the two. The incoming video signal is then displayed on a display unit 28. Thus, even though the picture settings of the incoming video are different than the current picture settings, there is little fluctuation when the incoming video signal is displayed because the incoming video signal has been adjusted to match the current picture settings.

Figure 2:
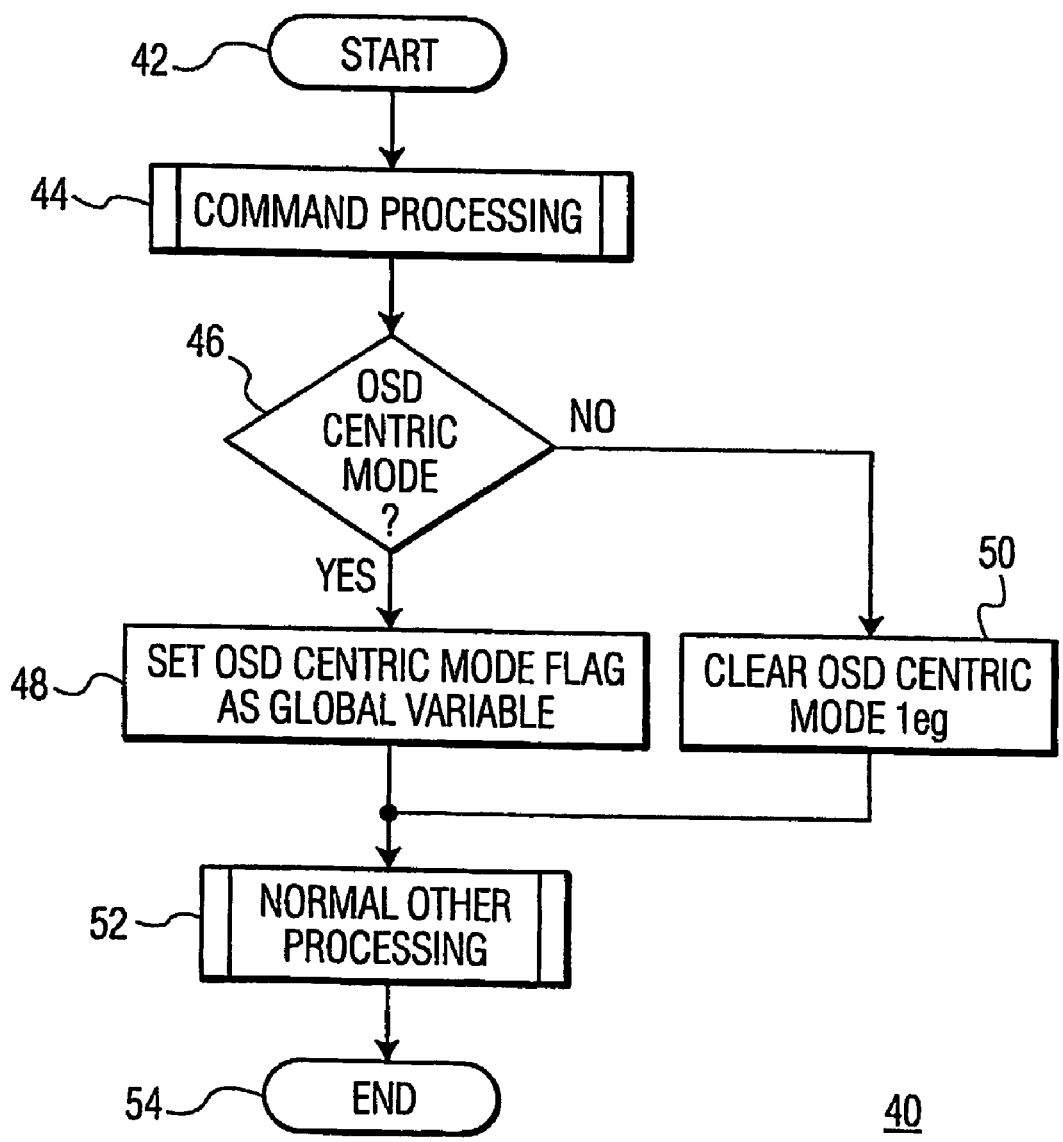
FIG. 2 is a process flow diagram showing a process for determining if the system should be in OSD or Graphic Centric Mode in accordance with embodiments of the present invention.

FIG. 2 is a process flow diagram showing a process for determining if the video system should be in OSD or Graphic Centric Mode in accordance with embodiments of the present invention. The process is generally designated using a reference numeral 40. This process may be continually running in the background of the video system. In block 42, the process starts with the receipt of a control command. The control command may direct the video system to perform any number of functions, including change channels, change inputs, or turn the OSD on or off. The control command may be received from a number of sources, including a remote control or buttons on the video system. After processing the control command, the current state of the video system is checked in block 46. If the device is in OSD mode, an OSD flag is set in block 48. Otherwise, the OSD flag is cleared in block 50. Normal processing continues at block 52. At block 54, the process ends.

Figure 3:
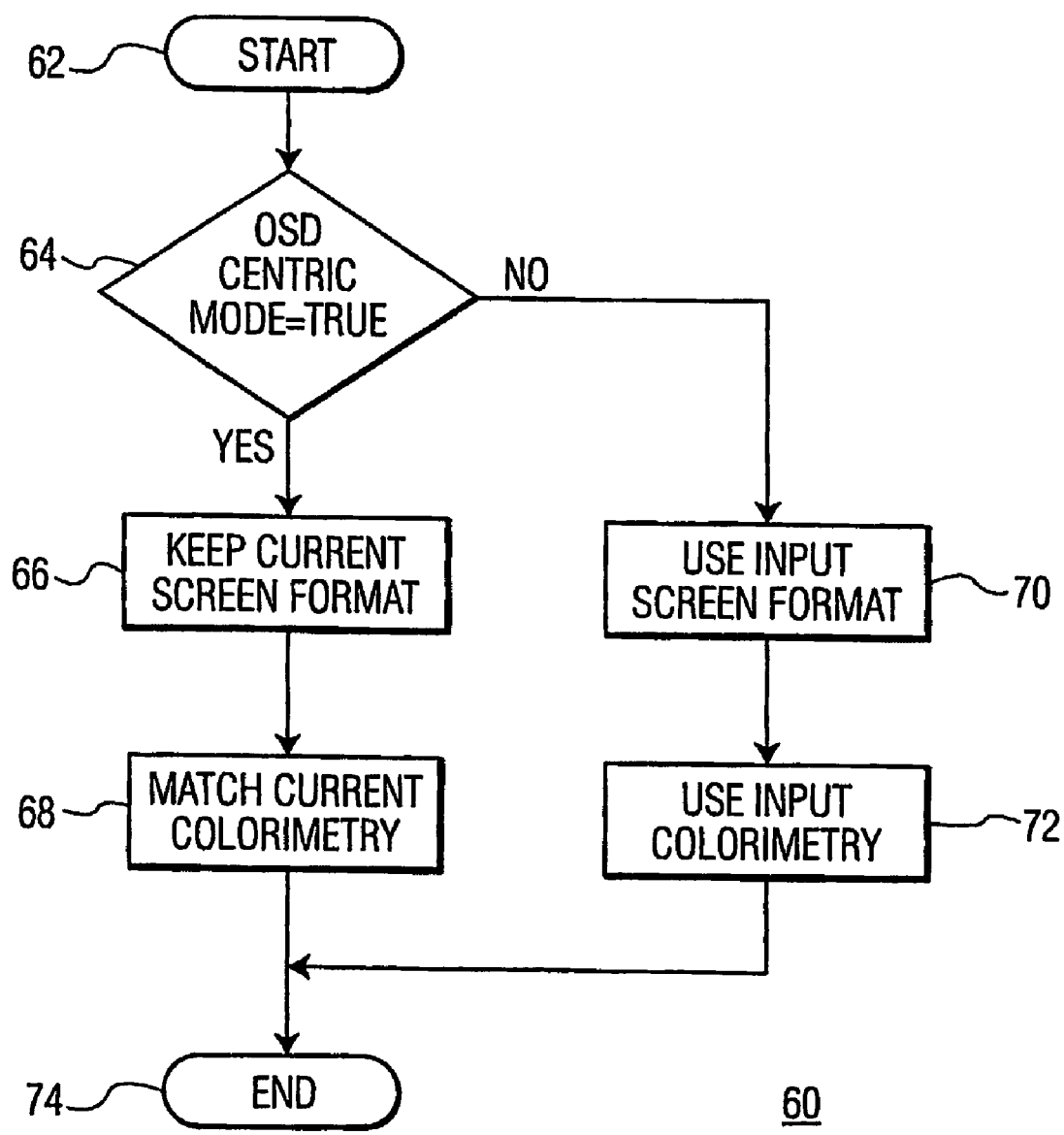
FIG. 3 is a process flow diagram showing the picture setting selection process in accordance with embodiments of the present invention.

FIG. 3 is a process flow diagram showing the picture setting selection process in accordance with embodiments of the present invention. The process is generally designated using a reference numeral 60. At block 64, a test is performed to determine if the OSD flag has been set. If the OSD flag is set, the current screen format is maintained in block 66 and the system converts the incoming video colorimetry settings to match the current colorimetry settings in block 68. On the other hand, if the OSD flag is clear, the screen format embedded in the incoming video signal is selected, as shown at block 70. In that case, the color conversion matrix is generated based on the incoming video signal (block 72). At block 74, the process ends.

This detailed description has focused on two individual picture settings: screen format and colorimetry. It is should be noted that screen format and colorimetry are merely two examples of picture settings. Other examples may fall within the scope of the present invention.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A system for modifying video signals, the system comprising:
    at least one decoder that decodes a video signal that comprises embedded picture setting data;
    an on-screen display processor for generating an on-screen display signal when said system is in an on-screen display mode; and
    a video processor having sufficient resources for displaying said video signal and said on-screen display signal with a desired embedded picture setting data, said video processor adapted to:
        detect whether the system is operating in said on-screen display mode;
        detect when said desired embedded picture setting data change;
        apply the desired embedded picture setting data to the display screen when the desired picture setting data change if the system is not in the on-screen display mode; and
        withhold the desired embedded picture setting data from the display screen when the desired picture setting data change if the system is in the on-screen display mode.

2. The system set forth in claim 1, wherein the embedded picture setting data comprises screen format data.

3. The system set forth in claim 1, wherein the embedded picture setting data comprises colorimetry data.

4. The system set forth in claim 3, comprising a color conversion device that performs a color conversion based on the colorimetry data.

5. The system set forth in claim 1, comprising a display device configured to display an image based on the video signal.

6. The system set forth in claim 1, wherein the video processor is adapted to set a flag if the system is operating in the OSD mode.

7. The system set forth in claim 1, wherein the system comprises a portion of a television set.

8. A method of modifying video signals, the method comprising the acts of:
    decoding a video signal that comprises embedded picture setting data;
    generating an on-screen display signal;
    detecting whether a system is operating in an on-screen display mode;
    detecting when the embedded picture setting data change;
    displaying with adequate resources the video signal according to a set of parameters from the embedded picture setting data when the embedded picture setting data change if the system is not in the on-screen display mode; and displaying with adequate resources the video signal and the on-screen display signal, while withholding changing the set of parameters when the embedded picture setting data change if the system is in the on-screen display mode.

9. The method set forth in claim 8, the act of determining whether the embedded picture setting data comprises screen format data.

10. The method set forth in claim 8, comprising the act of determining whether the embedded picture setting data comprises colorimetry data.

11. The method set forth in claim 10, comprising the act of performing a color conversion based on the colorimetry data.

12. The method set forth in claim 8, comprising the act of displaying an image based on the video signal.

13. The method set forth in claim 8, comprising the act of setting a flag if the system is operating in the OSD mode.

14. A system for modifying video signals, the system comprising:

means for decoding a video signal that comprises embedded picture setting data;

means for generating an on-screen display signal;

means, having sufficient resources for displaying said video signal and said on-screen display signal, means for detecting whether the system is operating in an on-screen display mode;

means for applying the embedded picture setting data to the display screen when the embedded picture setting data change if the system is not in the on-screen display mode; and means for retaining the previous embedded picture setting data from the entire display screen when the embedded picture setting data change if the system is in the screen display mode.

15. The system set forth in claim 14, wherein the embedded picture setting data comprises screen format data.

16. The system set forth in claim 14, wherein the embedded picture setting data comprises colorimetry data.

17. The system stem set forth in claim 16, comprising means for performing a color conversion based on the colorimetry data.

18. The system set forth in claim 14, comprising a display device configured to display an image based on the video signal.

19. The system set forth in claim 14, wherein the means for detecting is adapted to set a flag if the system is operating in OSD mode.

20. The system set forth in claim 14, wherein the system comprises a portion of a television set.

* * * * *